United States Patent [19]

Chamberlain et al.

[11] Patent Number: 5,039,755

[45] Date of Patent: Aug. 13, 1991

[54] SELECTIVE HYDROGENATION OF CONJUGATED DIOLEFIN POLYMERS

[75] Inventors: Linda R. Chamberlain, Richmond; Carma J. Gibler, Houston, both of Tex.

[73] Assignee: Shell Oil Company, Houston, Tex.

[21] Appl. No.: 529,807

[22] Filed: May 29, 1990

[51] Int. Cl.$^5$ .............................................. C08F 8/04
[52] U.S. Cl. .................... 525/338; 525/337.8; 525/332.9; 525/333.1; 525/333.2; 525/339
[58] Field of Search ................................ 525/338, 339

[56] References Cited

U.S. PATENT DOCUMENTS

| | | | |
|---|---|---|---|
| 2,449,949 | 9/1944 | Morris et al. | 260/74 |
| 3,113,986 | 12/1963 | Breslow et al. | 260/683.9 |
| 3,472,829 | 10/1969 | Claybaugh et al. | 260/93.7 |
| 3,475,399 | 10/1969 | Peters et al. | 260/93.7 |
| 3,525,729 | 8/1970 | Gaeth | 260/94.3 |
| 3,541,064 | 11/1970 | Yoshimoto et al. | 260/85.1 |
| 3,580,897 | 5/1971 | Yoshimoto et al. | 260/85.1 |
| 3,720,654 | 3/1973 | Olechowski | 260/85.3 R |
| 3,937,759 | 2/1976 | Baumgartner et al. | 260/879 |
| 4,014,859 | 3/1977 | Cooper et al. | 526/65 |
| 4,156,673 | 5/1979 | Eckert | 260/33.6 AQ |
| 4,340,703 | 7/1982 | Freppel | 526/79 |
| 4,501,857 | 2/1985 | Kishimoto et al. | 525/338 |
| 4,547,555 | 10/1985 | Cook et al. | 526/60 |
| 4,629,767 | 12/1986 | Shyr et al. | 525/339 |
| 4,673,714 | 6/1987 | Kishimoto et al. | 525/314 |

FOREIGN PATENT DOCUMENTS

| | | |
|---|---|---|
| 0339986 | 11/1989 | European Pat. Off. . |
| 62-209102 | 9/1987 | Japan . |
| 62-209103 | 9/1987 | Japan . |
| 363810 | 12/1931 | United Kingdom . |

OTHER PUBLICATIONS

Ziegler-Natta Catalysts and Polymerizations, John Boor, Jr., published by Academic Press in 1979.
Journal of Organo Metallic Chemistry, Feb. 6, 1990, vol. 382, Nos. 1 and 2, pp. 69–76.

*Primary Examiner*—Bernard Lipman
*Attorney, Agent, or Firm*—Donald F. Haas

[57] ABSTRACT

This is a process for the hydrogenation of conjugated diolefin polymers which comprises polymerizing or copolymerizing at least one conjugated diolefin with an organo alkali metal polymerization initiator in a suitable solvent thereby creating a living polymer, terminating the polymerization by the addition of hydrogen and effecting selective hydrogenation of the unsaturated double bonds in the conjugated diolefin units of the terminated polymer by contacting the polymer, in the absence of hydrocarbon lithium and alkoxy lithium compounds, with hydrogen in the presence of at least one bis(cyclopentadienyl)titanium compound.

28 Claims, 1 Drawing Sheet

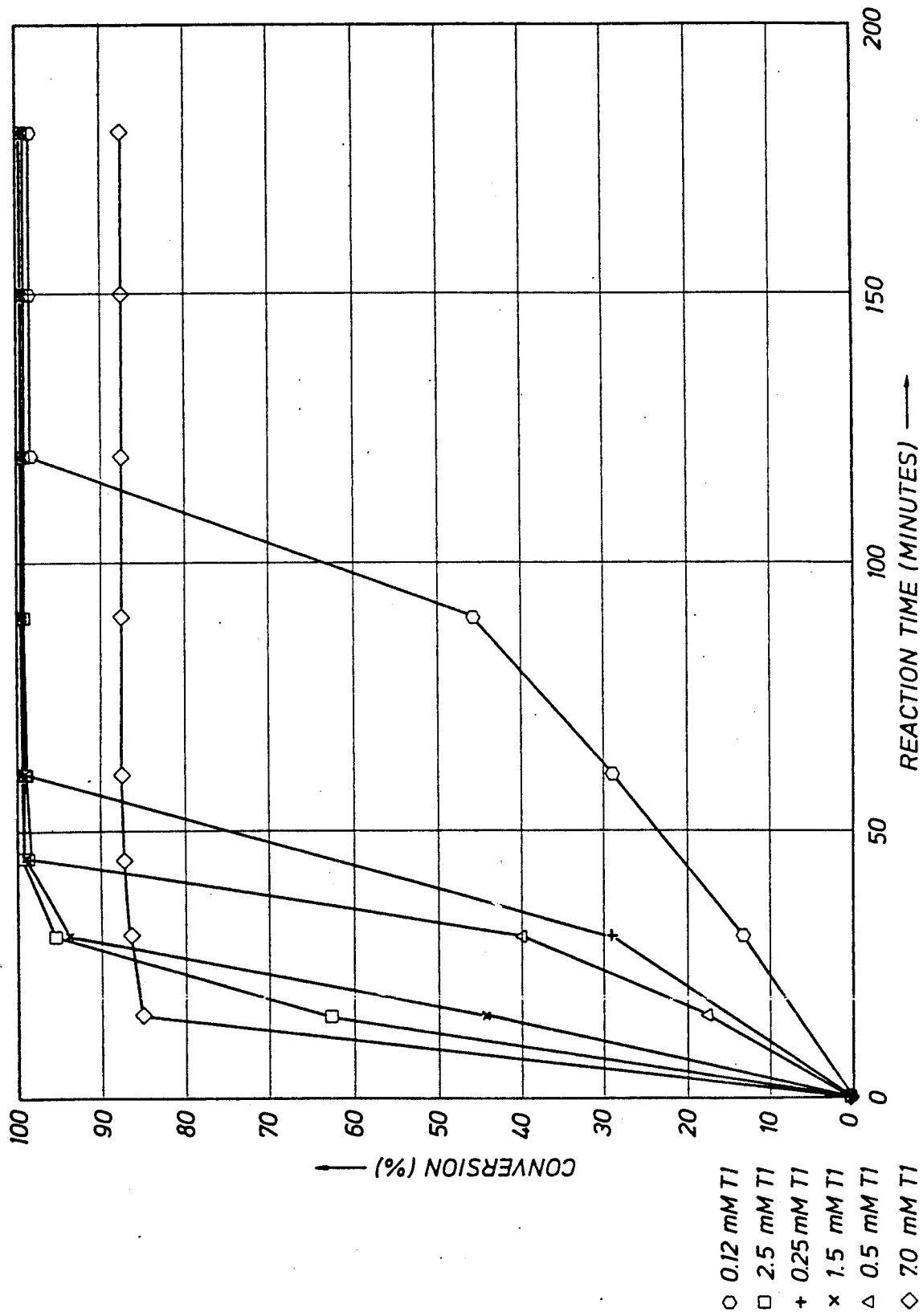

SELECTIVE HYDROGENATION OF CONJUGATED DIOLEFIN POLYMERS

BACKGROUND OF THE INVENTION

The present invention relates to a process for the production of selectively hydrogenated polymers of conjugated dienes and more particularly to such a process utilizing a titanium hydrogenation catalyst.

The hydrogenation or selective hydrogenation of conjugated diene polymers has been accomplished using any of the several hydrogenation processes known in the prior art. For example the hydrogenation has been accomplished using methods such as those taught, for example, in U.S. Pat. Nos. 3,494,942; 3,634,594; 3,670,054; 3,700,633 and Re. 27,145, the disclosure of which patents are incorporated herein by reference. These methods known in the prior art for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising a Group VIII metal.

In the methods described in the foregoing patents, a catalyst is prepared by combining a Group VIII metal, particularly nickel or cobalt, compound with a suitable reducing agent such as an aluminum alkyl. Also, while aluminum alkyls are the preferred reducing agents, it is known in the prior art that alkyls and hydrides of metals of Groups I-A, II-A and III-B of the Periodic Table of the Elements are effective reducing agents, particularly lithium, magnesium and aluminum. In general, the Group VIII metal compound is combined with Group I-A, II-A or III-B metal alkyl or hydride at a concentration sufficient to provide Group I-A, II-A and/or III-B metal to Group VIII metal ratios within the range from about 0.1:1 to about 20:1, preferably from about 1:1 to about 10:1. As indicated in the foregoing patents, the hydrogenation catalyst is generally prepared by combining the Group VIII metal compound and the reducing agent in a suitable solvent or diluent at a temperature within the range from about 20° C. to about 60° C. before the catalyst is fed to the hydrogenation reactor.

In 1985, Kishimoto et al. disclosed (in U.S. Pat. No. 4,501,857) that selective hydrogenation of the unsaturated double bonds in conjugated diolefin polymers could be achieved by hydrogenating such polymers in the presence of at least one bis(cyclopentadienyl)-titanium compound and at least one hydrocarbon lithium compound wherein the hydrocarbon lithium compound can be an added compound or a living polymer having a lithium atom in the polymer chain. European patent application 0,339,986 discloses that similar hydrogenation activity can be accomplished with the same titanium compounds in combination with an alkoxy lithium compound which can either be added directly or as a reaction mixture of an organo lithium compound with an alcoholic or phenolic compound. The use of these catalyst systems was said to be advantageous because the catalysts were said to be highly active so that they were effective even in such a small amount as not to affect adversely the stability of a hydrogenated polymer and require no deashing step. Further, the hydrogenation was said to be able to be carried out under mild conditions.

In U.S. Pat. No. 4,673,714, bis(cyclopentadienyl)-titanium compounds were disclosed which preferentially hydrogenate the unsaturated double bonds of conjugated diolefins but do not require the use of an alkyl lithium compound. These titanium compounds were bis(cyclopentadienyl)titanium diaryl compounds. The elimination of the need for the hydrocarbon lithium compound was said to be a significant advantage of the invention disclosed in the '714 patent.

SUMMARY OF THE INVENTION

The present invention provides a process for the hydrogenation of conjugated diolefin polymers which first involves the polymerization or copolymerization of such monomers with an organo alkali metal polymerization initiator in a suitable solvent thereby creating a living polymer. The living polymer is terminated by the addition of hydrogen. Finally, selective hydrogenation of the unsaturated double bonds in the conjugated diolefin units of the terminated polymer is carried out in the presence of at least one bis(cyclopentadienyl)titanium compound preferably of the formula:

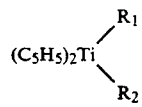

wherein $R_1$ and $R_2$ are the same or different and are selected from the group consisting of halogen groups, $C_1$–$C_8$ alkyl and alkoxy groups, $C_6$–$C_8$ aryloxy groups, aralkyl, cycloalkyl groups, silyl groups and carbonyl groups. The hydrogenation step is carried out in the absence of hydrocarbon lithium and alkoxy lithium compounds.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

wherein: R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, diethyl ether, tetrahydrofuran and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference. In general, linear and branched block copolymers which may be used in the present invention include those which may be represented by the general formula:

$$A_z{-}(B{-}A)_y{-}B_x$$

wherein:
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 or 1;
y is a whole number ranging from 0 to about 15, and the sum of $x+z+y \geqq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x{-}(A{-}B)_y{-}A_z]_n{-}C{-}P_{n'}$$

wherein:
A, B, x, y and z are as previously defined; n and n' are, independently, numbers from 1 to about 100 such that $n+n' \geqq 3$;
C is the core of the coupled or radial polymer formed with a polyfunctional coupling agent; and
Each P is the same or a different polymer block or polymer segment having the general formula:

$$B'_{x'}{-}(A'{-}B'')_{y'}{-}A''_{z'}$$

wherein:
A'' is a polymer block containing predominantly monoalkenyl aromatic hydrocarbon monomer units;
B' is a polymer block containing predominantly conjugated diolefin monomer units;
A'—B'' is a polymer block containing monoalkenyl aromatic hydrocarbon monomer units (A') and conjugated diolefin monomer units (B''), the A'—B'' monomer units may be random, tapered or block and when A'—B'' is block, the A' block may be the same or different from A'' and B'' may be the same or different from B';
x' and z' are, independently, numbers equal to 0 or 1; and
y' is a number from 0 to about 15, with the proviso that the sum of $x'+y'+z \geqq 1$.

The radial polymers may, then, be symmetric or asymmetric.

In the production of all of the polymers described above, the polymerization is herein terminated by utilizing hydrogen gas in place of the conventionally used alcohol terminating agent. The living polymer, or more accurately, the living end of the polymer chain, is terminated by the addition of hydrogen thereto. The theoretical termination reaction is shown using an S—B—S block copolymer for exemplary purposes:

$$S{-}B{-}S^-Li^+ + H_2 \rightarrow S{-}B{-}SH + LiH$$

As shown above, it is theorized that lithium hydride is formed during the termination process. Formed in this manner, it is not a reactive polymerization initiator. It is inert to polymerization and does not interfere with the molecular weight control of the next polymerization batch as alcohol can.

It is usually advisable to contact and vigorously mix the gas with the polymerization solution at the end of the polymerization reaction. This contact and vigorous mixing can be effected by adding the hydrogen gas through spargers in a mixing vessel containing polymer solution. The time of contact should be at least about ten seconds and preferably about twenty minutes to allow sufficient contact time for the reaction to occur. This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in appropriate solution and added to the polymer solution to be terminated. Another method would be to cause the hydrogen to be absorbed into an absorption bed and then cause the polymer solution to flow through the absorption bed. The hydrogen contact could also be carried out by adding a material which gives off hydrogen upon decomposition, i.e. diimide.

When this improvement is used, the problems of using alcohol, i.e. the formation of lithium alkoxides and excess alcohol impurities, are avoided. Furthermore, this process has been found to have significant advantage if the polymer made is to be hydrogenated. It has been found that if the present method is used, a bis(cyclopentadienyl)titanium hydrogenation catalyst may be used without the necessity of a hydrocarbon lithium or alkoxy lithium promoter, whether added with the catalyst or present in the living polymer.

As stated above, the hydrogenation step of the present process is carried out in the presence of a bis(cyclopentadienyl)titanium compound of the formula:

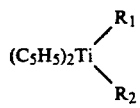

wherein $R_1$ and $R_2$ are the same or different and are selected from the group consisting of halogen groups, $C_1$–$C_8$ alkyl and alkoxy groups, $C_6$–$C_8$ aryloxy groups, aralkyl, cycloalkyl groups, silyl groups and carbonyl groups. The hydrogenation step is carried out in the absence of hydrocarbon lithium and alkoxy lithium compounds.

Specific bis(cyclopentadienyl) compounds which may be used in the present invention include bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium dicarbonyl, bis(cyclopentadienyl)titanium dimethyl, bis(cyclopentadienyl)titanium diethyl, bis(cyclopentadienyl)titanium dibutyl (including n-butyl, sec-butyl, tert-butyl), bis(cyclopentadienyl)titanium bis(trimethylsilylmethyl), bis(cyclopentadienyl)titanium dibenzyl, bis(cyclopentadienyl)titanium dihexyl, bis(cyclopentadienyl)titanium dimethoxide, bis(cyclopentadienyl)titanium diethoxide, bis(cyclopentadienyl)titanium dibutoxide, bis(cyclopentadienyl)titanium dipentoxide, bis(cyclopentadienyl)titanium dineopentoxide, bis(cyclopentadienyl) titanium diphenoxide, and all mixtures thereof. The preferred titanium compound is bis(cyclopentadienyl) titanium dichloride because of ease of handling, air stability and commercial availability.

This process will selectively hydrogenate conjugated diolefins without hydrogenating alkenyl aromatic hydrocarbons to any degree. Hydrogenation percentages of greater than 50% are easily obtained but it has been found that in order to achieve hydrogenation percentages of greater than 95% as is often desired, the alkali metal (for example, lithium) to titanium ratio must be at least about 2:1 and preferably is from about 3 to 30. There has to be sufficient alkali metal to ensure quick and sufficient interaction between the two metals. A high viscosity (high molecular weight) polymer may require a higher ratio because of the lesser mobility of the metals in the polymer cement. If alkali metal hydride must be added to increase the ratio, it can be made in situ by adding an organo alkali metal compound and hydrogen to the polymer (i.e., sparge), either before or after termination of the polymerization.

In general, the hydrogenation is carried out in a suitable solvent at a temperature within the range of from about 0° to about 120° C., preferably about 60° to about 90° C., and at a hydrogen partial pressure within the range from about 1 psig to about 1200 psig, preferably from about 100 to about 200 psig. Catalyst concentrations within the range from about 0.01 mM(millimoles) per 100 grams of polymer to about 20 mM per 100 grams of polymer, preferably 0.04 to 1 mM catalyst per 100 grams of polymer, are generally used and contacting at hydrogenation conditions is generally continued for a period of time within the range from about 30 to about 360 minutes. Suitable solvents for hydrogenation include, among others, n-heptane, n-pentane, tetrahydrofuran, cyclohexane, toluene, hexane and benzene. Because of the small amount of catalyst present in the polymer after hydrogenation, it is not necessary to separate the hydrogenation catalyst and catalyst residue from the polymer. However, if separation is desired, it may be carried out using methods well known in the prior art. Hydrogenation may be carried out in other manners such as batch processes, continuous processes, and semi-continuous processes.

EXAMPLES

Homopolybutadiene, polystyrene-polybutadiene-polystyrene, and polyisoprene-polystyrene block copolymers were terminated with hydrogen. Typically, at the end of the polymerization reaction, the living polymer cement was sparged with hydrogen gas (1.0 SCFM) from 5 to 60 minutes and vigorously mixed. Generally, the temperature of the polymer cement was 60° C. and no increase in temperature was observed during the termination step. During the sparging stage of the reaction, the total pressure in the reactor ranged from 40 to 100 psig of hydrogen. Termination was confirmed by four independent methods. The first of these was a simple colorimetric examination of the polymer cement. Styryllithium living ends have an absorption maximum at 328 m$\mu$ and thus have a distinct orange color which turn colorless when the living ends are terminated. This was observed in hydrogen termination as samples were pulled from the reactor and visually, as well as colorimetrically, examined for color change. The second method for determining termination was gel permeation chromatography (GPC). Analysis of the hydrogen terminated polymers by GPC showed that there was no high molecular weight polymer (HMP) formed. The absence of HMP generally indicates that the polymer has not crosslinked. Crosslinking is a typical detrimental side reaction in non-terminated polymer cements. Another method used to verify termination was $^2$H NMR. Deuterium gas was used to terminate the living polymer. During the termination, samples were submitted for $^2$H NMR analysis. Polymer termination was essentially complete when there was no increase in deuterium incorporation. The last method employed involved adding styrene monomer back to the terminated polymer. If any living ends are still existing after the sparge, they will polymerize the added monomer.

EXAMPLE 1

A 600 lb. batch of polystyrene-polybutadiene-polystyrene (S—B—S$^-$Li$^+$) block copolymer 50,000 molecular weight was made by anionic polymerization using sec-butyllithium as the initiator in a 150 gallon pressurized reactor. The polymerization took place in a mixture of cyclohexane and diethyl ether. The resulting polymer solution contained 20% polymer by weight.

At the end of the polymerization reaction, the reactor temperature was approximately 60° C. The reactor was sparged with hydrogen for approximately 20 minutes. A colorimeter was used to determine when the termination was complete since S—B—S$^-$Li$^+$ has a distinct orange color. The colorimeter reading still showed "color" after 15 minutes of sparge time. At that time, the vent was closed and the reactor pressured up to 80 psig with hydrogen. The temperature was raised to decrease viscosity and improve mass transfer. The solution was mixed for 20 more minutes. During that time, the colorimeter reading dropped to baseline which reflects a terminated polystyrene-polybutadiene-polystyrene (S—B—S) polymer.

All hydrogenation runs were carried out under similar conditions unless otherwise noted. A typical experimental hydrogenation run consisted of pressure transferring to a 4-liter reactor a 12–25% by weight solution of polymer. The temperature of the reactor was maintained at 70° C. At this point, bis(cyclopentadienyl)-titanium dichloride, ($Cp_2TiCl_2$), was added to the reactor as a toluene or cyclohexane slurry. After addition of the catalyst, the reactor was pressurized to 140 psig with hydrogen gas. The reaction was allowed to run for 3 hours, during which time samples were drawn from the reactor and analyzed by proton NMR to determine final percent conversion of olefin. Gel Permeation Chromatography (GPC) was done on final samples to determine if there had been any changes in molecular architecture.

EXAMPLES 2-7

Hydrogenation of Hydrogen Terminated Polymer with Varying Amounts of $Cp_2TiCl_2$ Catalyst A polystyrene-polybutadiene-polystyrene type polymer of 50,000 molecular weight was prepared as in Example 1. The polymer solution was 20% by weight polymer. The polymer was hydrogenated with varying amounts of catalyst as indicated in Table 1. The results of the hydrogenation run are shown in Table 1.

TABLE 1

| Example | Ti (mM) (100 gram polymer) | Li:Ti ratio | Olefin Conversion, % |
|---------|---------------------------|-------------|----------------------|
| 2 | 0.04 | 56:1 | 97.2 |
| 3 | 0.08 | 28:1 | 98.5 |
| 4 | 0.16 | 14:1 | 99.6 |
| 5 | 0.48 | 5:1 | 99.3 |
| 6 | 0.80 | 3:1 | 98.5 |
| 7 | 2.24 | 1:1 | 87.5 |

FIG. 1 graphically represents the Table 1 hydrogenation runs by showing percent olefin conversion over time. It was observed that catalyst loadings ranging from 0.04 to 0.80 mM Ti per 100 grams polymer resulted in >97% conversion of the olefin within 3 hours. As expected, the rate of hydrogenation decreased with decreasing catalyst loading, with the lowest catalyst loading of 0.04 mM Ti per 100 grams polymer requiring substantially longer reaction time. At a catalyst loading of 2.24 mM Ti per 100 grams polymer, it was observed that catalyst activity was initially incredibly rapid but leveled off quickly at only 87.5% conversion of the olefin. Noting this hydrogenation run, it appeared that there existed an optimum titanium concentration which was dependent on the concentration of LiH present from the polymerization termination step. Whereas the runs made with 0.04 to 0.80 mM Ti per 100 grams polymer always had an excess of LiH (Li:Ti ratios ranging from 56:1 to 3:1), the 2.24 mM Ti per 100 grams polymer run calculated to be a 1:1 Li:Ti ratio.

EXAMPLE 8

Hydrogenation of Hydrogen Terminated Polymer with Bis(Cyclopentadienyl)Titanium Diethoxide A polystyrene-polybutadiene-polystyrene type polymer of 50,000 molecular weight was prepared as in Example 1. The polymer solution was 20% by weight polymer. Bis(cyclopentadienyl titanium diethoxide (0.33 mM Ti per 100 grams polymer), as a cyclohexane slurry, was added to the reactor. After addition of the catalyst, the reactor was pressurized to 140 psig hydrogen and the temperature was maintained at 70° C. The hydrogenation reaction was allowed to proceed for 3 hours. Final conversion of the olefin was 98%.

EXAMPLE 9

Hydrogenation of Methanol Terminated Polymer Feed

A 5% by weight solution of a polystyrene-polybutadiene-polystyrene type polymer of 50,000 molecular weight that had been terminated with methanol was transferred to a 4 liter reactor. The solution was sparged with hydrogen for 20 minutes. The contents of the reactor were heated to 40° C. and the hydrogen pressure within the reactor was 70 psig. Bis(cyclopentadienyl)titanium dichloride (3.2 mM Ti per 100 grams of polymer) was added to the reactor as a catalyst/toluene slurry. During the first 150 minutes, no hydrogenation occurred. After 150 minutes, 7.5 mM of sec-butyl lithium was added and hydrogenation proceeded to 82% conversion.

EXAMPLE 10

Hydrogenation of Methanol Terminated Polymer Feed

A 20% by weight solution of a polystyrene-polybutadiene-polystyrene type polymer of 50,000 molecular weight that had been terminated with methanol was transferred to a 4 liter reactor. The contents of the reactor were heated to 40° C. The solution was sparged with hydrogen for 20 minutes. The reactor temperature was maintained at 70° C. and the hydrogen pressure within the reactor was 140 psig. Bis(cyclopentadienyl)-titanium dichloride (0.8 mM Ti per 100 grams of polymer) was added to the reactor as a catalyst/toluene slurry. During the first 120 minutes no hydrogenation occurred. After 120 minutes, 15 mM of sec-butyl lithium were added to the reactor and hydrogenation proceeded to 62% conversion.

EXAMPLE 11

Hydrogenation of a High Molecular Weight Hydrogen Terminated Polymer

A polystyrene-polybutadiene-polystyrene type polymer of 165,700 molecular weight was prepared as in Example 1. The polymer solution was 12.1% by weight polymer. The polymer was hydrogenated with bis(cyclopentadienyl)titanium dichloride (0.16 mM Ti per 100 grams polymer). The LiH:Ti ratio for the hydrogenation run was 4:1. The final conversion of the olefin was 10%. This LiH:Ti is not high enough for such a high molecular weight polymer.

EXAMPLE 12

Hydrogenation of a High Molecular Weight Hydrogen Terminated Polymer

To the polymer synthesized for Example 10 was added 1.8 mM sec-butyl lithium, followed by sparging and vigorously mixing the polymer solution with hydrogen gas for 20 minutes. To ensure that all the sec-butyl lithium had reacted with the hydrogen gas, styrene monomer was added back to the polymer solution. The absence of orange color (which would be present if sec-butyl lithium reacted with styrene) verified that there was only LiH present in the polymer solution. Next, bis(cyclopentadienyl)titanium dichloride (0.16 mM Ti per 100 grams of polymer) was added to the polymer feed and the hydrogenation reaction was allowed to proceed. The LiH:Ti ratio for the hydrogenation run was 10:1. The final conversion of the olefin was 98.7%. Thus, by adding LiH, the high molecular weight polymer can be successfully hydrogenated.

EXAMPLE 13

Hydrogenation of a High Molecular Weight Hydrogen Terminated Polymer

To the polymer synthesized for Example 10 (12.1% solids) was added 1.8 mM sec-butyl lithium. The polymer solution was not sparged with hydrogen gas so more LiH is not formed. Next, bis(cyclopentadienyl)titanium dichloride (0.16 mM Ti per 100 grams polymer) was added to the polymer solution, and the hydrogenation reaction was allowed to proceed. The LiR:Ti ratio for the hydrogenation run was 6:1. The final conversion of the olefin was 14.3%.

EXAMPLE 14

Hydrogenation of a High Molecular Weight Hydrogen Terminated Polymer

To the polymer synthesized for Example 10 (12.1% solids) was added a mixture of 1.8 mM sec-butyl lithium and 1.8 mM 2,6-di-t-butyl-4-methyl-phenol. The polymer was stirred for approximately three minutes. There was no hydrogen sparging so additional LiH was not formed. Next, bis(cyclopentadienyl)titanium dichloride (0.16 mM per 100 grams polymer) was added to the polymer solution and the hydrogenation reaction was allowed to proceed. The LiOR:Ti ratio for the hydrogenation run was 6:1. The final conversion of the olefin was 0%.

EXAMPLE 15

Hydrogenation of a High Molecular Weight Hydrogen Terminated Polymer

To the polymer synthesized for Example 10 (12.1% solids) was added 13 mM solid LiH—therefore, the LiH was *not* prepared in-situ. The polymer solution was sparged with hydrogen or nitrogen gas for 20 minutes. Next, bis(cyclopentadienyl)titanium dichloride (0.16 mM Ti per 100 grams polymer) was added to the polymer solution and the hydrogenation reaction was allowed to proceed. The LiH:Ti ratio for the hydrogenation run was 43:1. The final conversion of the olefin was 0%.

Table 2 is a summary of five hydrogenation runs carried out on the higher molecular weight polymer prepared as above.

| Example | Ti (mM) (100 gram polymer) | LiH:Ti ratio | LiX:Ti ratio | Olefin Conversion, % |
|---|---|---|---|---|
| 10 | .16 | 4:1 | — | 10.0 |
| 11 | .16 | 10:1 | — | 98.7 |
| 12 | .16 | 4:1 | 6:1 | 14.3 |
| 13 | .16 | 4:1 | 6:1 | 0.0 |
| 14 | .16 | 4:1 | 39:1 | 0.0 |

Where X=R(butyl), OR(2,6-di-t-butyl phenoxide), or H.

EXAMPLE 16

Hydrogenation of Hydrogen Terminated High Molecular Weight Polymer with Addition of LiH in the Polymerization Reactor To a batch of living polystyrene-polybutadiene-polystyrene type block copolymer of 165,700 molecular weight was added sec-butyl lithium. The reactor temperature was approximately 60° C. The reactor was then sparged with hydrogen for approximately 20 minutes to generate LiH by reaction of $H_2$ with sec-butyl lithium and also to terminate the polymerization. The resulting polymer solution contained 12.1% polymer by weight. The amount of LiH present in the polymer solution provides a LiH:Ti ratio of 10:1 for the hydrogenation reaction. The polymer solution was pressure transferred to a 4 liter reaction and heated to 70° C. Bis(cyclopentadienyl)titanium dichloride (0.08 mM Ti per 100 grams of polymer) was then added to the polymer solution. The reactor was then pressurized to 140 psig with hydrogen. Within 120 minutes, the hydrogenation of the olefin proceeded to 99%. There was no evidence of polystyrene hydrogenation.

EXAMPLE 17

Hydrogenation of High Molecular Weight Hydrogen Terminated Polymer with LiH Prepared Outside of Hydrogenation Reactor 3.6 mM sec-butyl lithium was added to 20 grams of cyclohexane in a 100 mL pressure vessel. The pressure vessel was pressurized to 140 psig hydrogen and mixed for 10 minutes, thereby forming LiH. The solution was then added to a 20% by weight polymer solution of a 50,000 molecular weight polystyrene-polybutadiene-polystyrene polymer. The polymer solution with the added LiH was allowed to stir for approximately 20 minutes. The contents of the reactor were heated to 70° C. and pressurized to 140 psig with hydrogen gas. To the reactor was then added bis(cyclopentadienyl)titanium dichloride (0.08 mM Ti per 100 grams polymer) as a cyclohexane slurry. Within 150 minutes, the hydrogenation of the olefin proceeded to 96%. There was no evidence of polystyrene hydrogenation.

EXAMPLE 18

Hydrogenation of a Hydrogen Terminated Polymer by a Semi-Continuous Process

A batch of hydrogen terminated polystyrene-polybutadiene-polystyrene type block copolymer of 50,000 molecular weight was evenly divided between two four liter reactors. To Reactor 1, no catalyst was added. To Reactor 2, bis(cyclopentadienyl)titanium dichloride (0.08 mM Ti per 100 grams of polymer) was added. Reactor 2 was then heated to 70° C. and pressurized to 140 psig with hydrogen gas. When the appropriate temperature and pressure were attained, the polymer solution in Reactor 1 was fed into Reactor 2. The rate of addition of the polymer solution in Reactor 1 to Reactor 2 was 13 grams per minute. Total addition time of the polymer solution of Reactor 1 to Reactor 2 was one hour. At the end of the one hour reaction time, the conversion of olefin was 88%. The contents of the Reactor 2, now having all the polymer solution, were then left to stir at 70° C. and 140 psig of hydrogen for 1 hour more. At the end of this time the total olefin conversion was 98%.

EXAMPLE 19

Hydrogenation of Hydrogen Terminated Polymer with Catalyst and Cocatalyst Premixed 1.8 mM sec-butyl lithium was added to 50 grams of cyclohexane in a 100 mL pressure vessel. The pressure vessel was pressurized to 140 psig hydrogen and mixed for 5 minutes, thereby forming LiH. The solution was depressurized and bis(cyclopentadienyl)titanium dichloride (0.16 mM Ti per 100 grams polymer) was added to the pressure vessel. The contents of the pressure vessel were then exposed to 140 psig hydrogen and mixed for 5 minutes. The catalyst solution was added to a 20% by weight solution of a polystyrene-polybutadiene-polystyrene type polymer of 165,700 molecular weight. The contents of the reactor were heated to 70° C. and pressurized to 140 psig hydrogen. Within 180 minutes, the hydrogenation proceeded to 98% conversion.

EXAMPLE 20

Hydrogenation of Hydrogen Terminated Polymer Containing Polyisoprene

A 20% by weight solution of a polystyrene-polyisoprene-polystyrene type polymer of 100,000 molecular weight that had been hydrogen terminated was transferred to a 4-liter reactor. To the reactor was added 30 mM sec-butyl lithium. The solution was sparged with hydrogen for 30 minutes to convert all of the sec-butyl lithium to LiH. The contents of the reactor were heated to 90° C. and the hydrogen pressure within the reactor was 500 psig. Bis(cyclopentadienyl)titanium dichloride (1.6 mM Ti per 100 grams of polymer) was added to the reactor as a catalyst/toluene slurry. Within 180 minutes, the hydrogenation proceeded to 77%. There was no evidence of polystyrene hydrogenation.

We claim:

1. A process for the hydrogenation of conjugated diolefin polymers which comprises:
    (a) polymerizing or copolymerizing at least one conjugated diolefin with an organo-alkali metal polymerization initiator in a suitable solvent thereby creating a living polymer,
    (b) terminating the polymerization by the addition of H$_2$ prior to hydrogenation, and
    (c) after termination selectively hydrogenating the unsaturated double bonds in the conjugated diolefin units of said terminated polymer by contacting the polymer, in the absence of hydrocarbon lithium and alkoxy lithium compounds, with hydrogen in the presence of at least one bis(cyclopentadienyl)titanium compound of the formula:

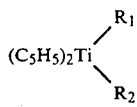

wherein R$_1$ and R$_2$ are the same or different and are selected from the group consisting of halogen groups, C$_1$-C$_8$ alkyl and alkoxy groups, C$_6$-C$_8$ aryloxy groups, aralkyl, cycloalkyl groups, silyl groups and carbonyl groups.

2. The process of claim 1 wherein the hydrogenation is carried out at a temperature from about 0° C. to about 120° C. and a pressure of from about 1 psig to about 1200 psig and the catalyst concentration is from about 0.01 mM to about 20 mM of titanium per 100 g of polymer and the contacting takes place for a period of time within the range from about 15 to about 1440 minutes.

3. The process of claim 2 wherein the hydrogenation is carried out at a temperature from about 60°-90° C. and a pressure from about 100-200 psig, the catalyst concentration is from about 0.04-1.0 mM titanium per 100 g of polymer, the alkali metal to titanium molar ratio is from about 3-30 and the contacting takes place for a period of time from about 30 to 360 minutes.

4. The process of claim 1 wherein the alkali metal initiator is an organo lithium compound.

5. The process of claim 4 wherein the organo lithium compound is sec-butyllithium.

6. The process of claim 1 wherein the titanium compound is selected from the group consisting of bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium dicarbonyl, bis(cyclopentadienyl)titanium dimethyl, bis(cyclopentadienyl)titanium diethyl, bis(cyclopentadienyl)titanium dibutyl, bis(cyclopentadienyl)titanium bis(trimethylsilylmethyl), bis(cyclopentadienyl)titanium dibenzyl, bis(cyclopentadienyl)titanium dihexyl, bis(cyclopentadienyl)titanium dimethoxide, bis(cyclopentadienyl)titanium diethoxide, bis(cyclopentadienyl)titanium dibutoxide, bis(cyclopentadienyl)titanium dipentoxide, bis(cyclopentadienyl)titanium dineopentoxide, bis(cyclopentadienyl)titanium diphenoxide and all mixtures thereof.

7. The process of claim 6 wherein the titanium compound is bis(cyclopentadienyl)titanium dichloride.

8. The process of claim 6 wherein the alkali metal initiator is an organo lithium compound.

9. The process of claim 8 wherein the organo lithium compound is sec-butyllithium.

10. The process of claim 1 wherein a metal hydride is created in-situ by the termination of the living polymer.

11. The process of claim 10 wherein lithium hydride is created in-situ by termination of the living polymer.

12. The process of claim 1 wherein the alkali metal:-titanium metal ratio during the hydrogenation is at least 2:1.

13. The process of claim 12 wherein alkali metal hydride is added to the polymer to be hydrogenated by adding an organo alkali metal compound and hydrogen to the polymer prior to addition of the hydrogenation catalyst.

14. The process of claim 13 wherein the metal hydride is created in-situ by the reaction of an organo alkali metal with hydrogen.

15. The process of claim 14 wherein lithium hydride is created in-situ by the reaction of a lithium alkali metal with hydrogen.

16. The process of claim 15 wherein lithium hydride is created in-situ by the reaction of sec-butyllithium with hydrogen.

17. The process of claim 12 wherein the titanium compound is selected from the group consisting of bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium dicarbonyl, bis(cyclopentadienyl)titanium dimethyl, bis(cyclopentadienyl)titanium diethyl, bis(cyclopentadienyl)titanium dibutyl (including n-butyl, sec-butyl, tert-butyl), bis(cyclopentadienyl)titanium bis(trimethylsilylmethyl), bis(cyclopentadienyl)titanium dibenzyl, bis(cyclopentadienyl)titanium dihexyl, bis(cyclopentadienyl)titanium dimethoxide, bis(cyclopentadienyl)titanium diethoxide, bis(cyclopentadienyl)titanium dibutoxide, bis(cyclopentadienyl) titanium dipentoxide, bis(cyclopentadienyl)titanium dineopentoxide, bis(cyclopentadienyl)titanium diphenoxide and all mixtures thereof.

18. The process of claim 17 wherein the titanium compound is bis(cyclopentadienyl)titanium dichloride.

19. The process of claim 18 wherein the alkali metal initiator is an organo lithium compound.

20. The process of claim 18 wherein the organo lithium compound is sec-butyllithium.

21. The process of claims 1, 6 or 13 wherein the conjugated diolefin is selected from the group consisting of butadiene and isoprene.

22. The process of claim 1 wherein the diolefin is copolymerized with a vinyl-substituted aromatic hydrocarbon.

23. The process of claim 22 wherein the diolefin is copolymerized with a monomer selected from the group consisting of styrene and styrene derivatives.

24. The process of claim 23 wherein the copolymer is a block copolymer having at least one conjugated diene polymer block and at least one styrene or styrene derivative block.

25. A process of claim 24 wherein the styrene or styrene derivatives block is about 3 to 90% by weight based on the total weight of the polymer.

26. The process of claim 24 wherein the conjugated diolefin is selected from the group consisting of butadiene and isoprene.

27. The process of claim 1 wherein at least 50% of the unsaturated bonds in the conjugated diene units are hydrogenated.

28. The process of claim 27 wherein at least 95% of the unsaturated bonds in the conjugated diene units are hydrogenated.

* * * * *